(12) United States Patent
Showalter et al.

(10) Patent No.: US 7,288,138 B2
(45) Date of Patent: Oct. 30, 2007

(54) THREE-PHASE CYCLONIC FLUID SEPARATOR

(75) Inventors: Stephen Showalter, Milmont Park, PA (US); Edward G. Kosteski, Glenolden, PA (US)

(73) Assignee: Eaton Corporation, Cleveland, OH (US)

( * ) Notice: Subject to any disclaimer, the term of this patent is extended or adjusted under 35 U.S.C. 154(b) by 372 days.

(21) Appl. No.: 10/994,441

(22) Filed: Nov. 22, 2004

(65) Prior Publication Data

US 2006/0107837 A1    May 25, 2006

(51) Int. Cl.
    *B01D 19/00*    (2006.01)
(52) U.S. Cl. .......................... 96/1; 96/209; 210/167.03; 210/223
(58) Field of Classification Search ............... 95/28, 95/261; 96/1, 209, 210, 211, 212; 210/512.1, 210/167.03, 167.02, 223, 695, 788
See application file for complete search history.

(56) References Cited

U.S. PATENT DOCUMENTS

| | | | |
|---|---|---|---|
| 4,199,443 A | | 4/1980 | Tauber |
| 4,282,016 A | * | 8/1981 | Tauber et al. .................. 96/212 |
| 4,707,165 A | | 11/1987 | Tauber et al. |
| 4,795,561 A | * | 1/1989 | Aslin ....................... 210/512.1 |
| 5,028,318 A | | 7/1991 | Aslin |
| 5,228,594 A | | 7/1993 | Aslin |
| 5,234,017 A | | 8/1993 | Aslin et al. |
| 5,961,700 A | * | 10/1999 | Oliver .......................... 96/158 |
| 6,348,087 B1 | * | 2/2002 | Aslin .......................... 96/210 |

* cited by examiner

*Primary Examiner*—Duane Smith
*Assistant Examiner*—Douglas J. Theisen
(74) *Attorney, Agent, or Firm*—Karen H. Ūthoff, Jr.

(57) ABSTRACT

An apparatus separates liquid, gas and solid components of a mixture in an engine lubricating system. An inlet for receiving the mixture opens tangentially into a separation chamber and a gas outlet has an opening in a first end wall adjacent the inlet to allow gas to exit the separator. A fluid outlet is in an opposing second end wall and opens into a lubricant reservoir of the engine lubricating system. Both liquid and gas flow through the fluid outlet between the separator and the reservoir. A particle collector is provided adjacent the second end wall to receive solids that become separated from the mixture. A baffle may be provided to direct the separated liquid from the separator into the reservoir while allowing gas in the reservoir to flow into the separator.

20 Claims, 1 Drawing Sheet

THREE-PHASE CYCLONIC FLUID SEPARATOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to devices for separating debris particles and gas from fluids in machinery, such as lubricants in an engine; and more particularly to such devices that perform the separation by creating a fluid vortex.

2. Description of the Related Art

Modern turbine engines, such as those used in aircraft, are lubricated by oil which is supplied to moving engine components by a pump that draws the oil from a reservoir. The oil flows from those components into sumps within the engine from which scavenger pumps force the fluid back to the reservoir. In the course of flowing through the engine, the oil often picks up debris particles and becomes aerated due to a turbulent flow. Therefore, it is common practice for this mixture to pass through an apparatus that separates the particles and entrained gas from the lubricating oil prior to entering the reservoir.

U.S. Pat. No. 6,348,087 discloses a three-phase cyclonic separator that has upper and lower chambers with a debris collector located there between. The fluid mixture from the engine flows tangentially into the top region of the upper chamber and travels in a vortex downward past the debris separator and into the lower chamber. The cyclonic motion drives the heavier debris particles outward and downward against the walls of the upper chamber and into the debris collector. An outlet chamber beneath the lower chamber has a gas support platform which causes a gas column to form in the center region of the lower chamber with the liquid lubricant, or oil, flowing around that gas column. A gas outlet is provided at the top center of the upper chamber through which gas that has been separated from the lubricant mixture exits the separator. The liquid lubricant exits the outlet chamber from one side. The gas support platform maintains a stable interface for the gas column to form and creates a liquid barrier that directs the separated gases through the gas outlet and minimizes gas migration through the liquid outlet.

In order to maintain the gas column within the separator, a pressure balance must exist between the fluid outlet and the gas outlet which typically is achieved by a properly sized restriction at the gas outlet. Thus, a net gauge pressure is created within the separator that is necessarily higher than the pressure within the reservoir into which the liquid lubricant flows from the separator. It has been found that the pressure balance can be optimized only for a particular flow condition due to the fixed geometry of the separator. As a consequence, prior cyclonic separators did not optimally accommodate changes in the gas/oil mixture which inevitably resulted from varying engine operating conditions. The pressure balance between the liquid outlet and the gas outlet to achieve gas/oil separation efficiency for a particular set of flow conditions has been referred to as "tuning".

Therefore, it is desirable to provide a three-phase cyclonic lubricant separator that efficiently operates over a range of flow conditions that occur during normal engine operation. Thus, it is desirable to create such a separator which is not tuned for a specific pressure balance or flow condition.

SUMMARY OF THE INVENTION

A three-phase separator includes a housing that forms a cylindrical separation chamber with a longitudinal axis, a first end wall and a second end wall. An inlet opens tangentially into the separation chamber to receive a mixture of a liquid, a gas, and a solid to be separated. Because of that tangential orientation, the mixture flows through the separation chamber in a helical vortex which creates a centrifugal force field that drives the debris particles to the outer reaches of the flow pattern, while at the same time allowing the gas bubbles to coalesce in the center of the pattern. A gas outlet has an opening in the first end wall of the separation chamber through which the gas that becomes separated from the mixture exits the separator. A fluid outlet, through which the liquid exits the separator, has an opening in the second end wall in alignment with the longitudinal axis of the separation chamber. A particle collector, located adjacent the second end wall, receives solids that are separated from the mixture.

A preferred embodiment of the three-phase separator provides a connector to attach the housing directly to a lubricant reservoir of a fluid system. Here the fluid outlet opens directly into the reservoir and gas above the liquid level in the reservoir is able to escape through the three-phase separator.

Preferably the liquid flow in the separation chamber makes at least two and one-half turns in the cyclonic pattern and the particles in the mixture are subjected to a centrifugal force between 25 G's and 50 G's. These flow characteristics are achieved by a separation chamber wherein the inlet has a diameter designated d, the fluid outlet has a diameter that is substantially equal to d/0.333, the separation chamber has a diameter that is substantially equal to d/0.246, and the separation chamber has a length that is substantially equal to d/0.193.

DETAILED DESCRIPTION OF THE INVENTION

Figure 1:
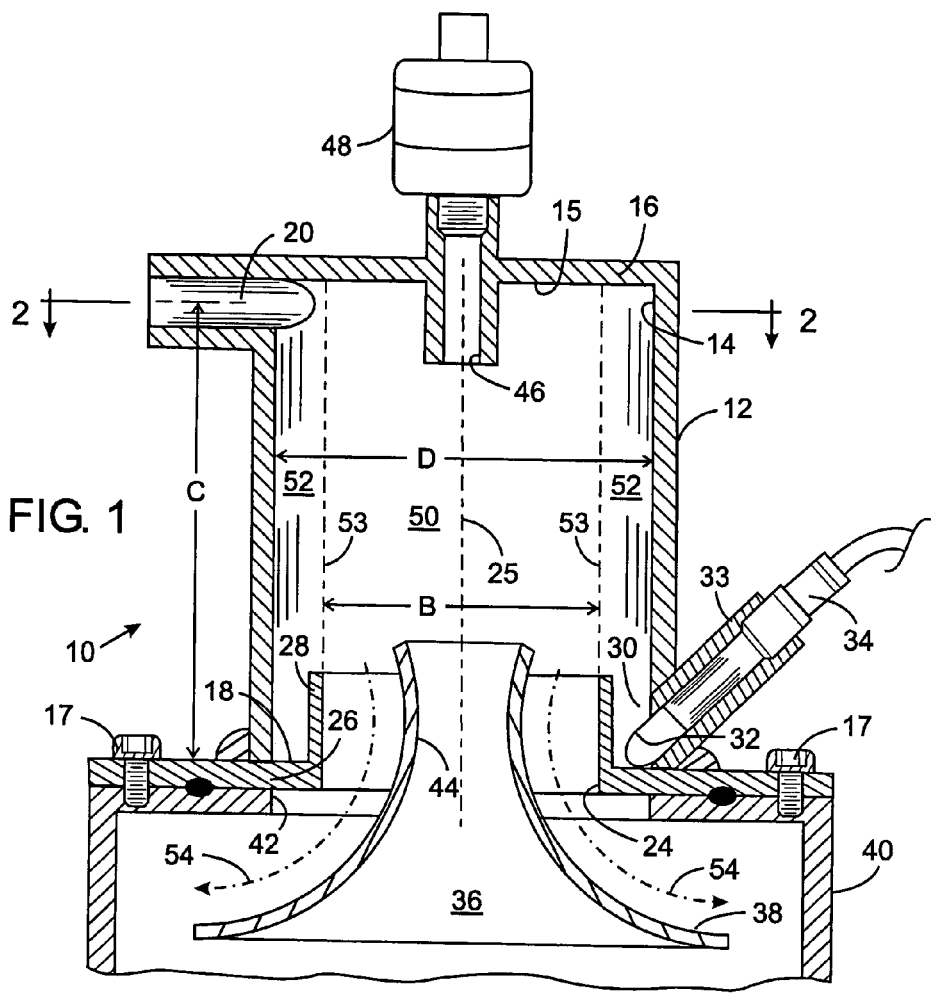
FIG. 1 is a vertical cross-section through a three-phase cyclonic separator according to the present invention.

With initial reference to FIG. 1, a three-phase separator 10 is provided to separate liquid, gas and solid components from a mixture. Although the separator 10 has particular utility in an engine lubrication system, it should be appreciated that the separator can be employed in other types of hydraulic systems. The separator 10 comprises a housing 12 that forms a circular cylindrical separation chamber 14 with a diameter designated "D". A first end wall 16 is located at a first, or top, end 15 of the separation chamber 14 and a second end wall 26 extends across a second, or bottom, end 18 abutting a reservoir 40 of the lubrication system. A plurality of machine screws 17 serve as a connector that attaches the separator 10 to the reservoir 40.

Figure 2:
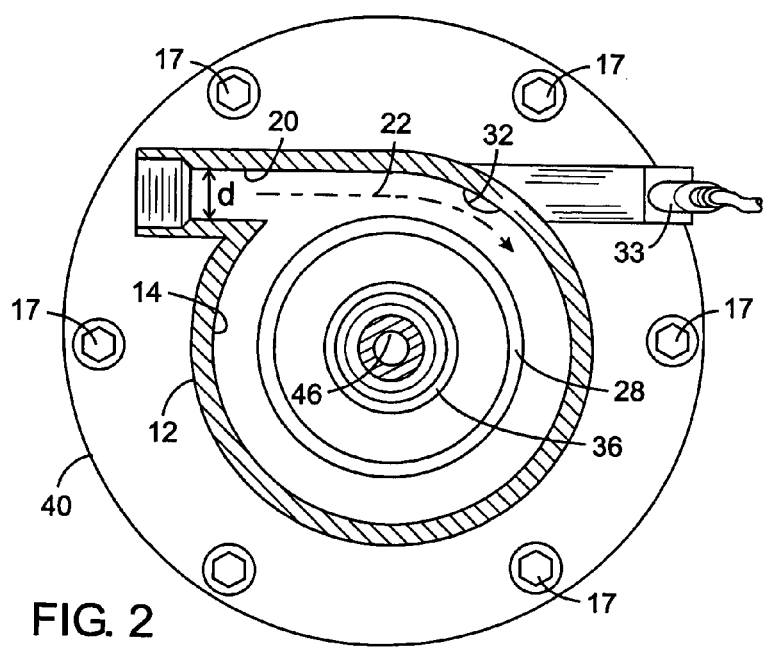
FIG. 2 is a cross-section along line 2-2 in FIG. 1.

With additional reference to FIG. 2, an inlet 20 is located adjacent the first end wall 16 and tangentially opens into the separation chamber 14. The diameter of the narrowest section of the inlet 20 is designated "d". As will be described, a mixture of materials to be separated enters the separation chamber 14 through the inlet 20 and thereafter flows in a helical vortex that spirals downward through the separation chamber toward the second end 18. The flow of fluid from the inlet 20 is depicted by the broken line 22. A fluid outlet 24 is formed at the center of second end wall 26 of the separation chamber 14 with an tubular collector wall 28 projecting from the second end wall into the separation chamber 14 and surrounding the fluid outlet 24. The diameter of the circular fluid outlet 24 is designated "B". Note that the fluid outlet 24 of the separator 10 is aligned with the longitudinal axis 25 of the separation chamber 14 and that axis extends through the fluid outlet. The present separator 10 incorporates only a single chamber 14 and the coaxial alignment of the fluid outlet 24 with the separation chamber 14 does not form a gas support surface in this separator.

The second end wall 26 and the collector wall 28 form a barrier defining a collection region 30 within the separation chamber 14 which receives particles that have been separated from the mixture entering through the inlet 20. A debris port 32 is formed in the side wall of the separation chamber 14 adjacent the collection region 30. The debris port 32 opens into a particle collector 33 having a magnetic probe 34 that gathers metal particles. Alternatively, the magnetic probe 34 can be replaced by a sensor that detects accumulation of particles and provides a signal when the quantity of particles reaches a given amount that requires removal by service personnel.

An optional baffle 36 is provided within the fluid outlet 24. The baffle has a generally horn shape with a smaller end within the separation chamber 14 and extending through the fluid outlet 24 and an inlet aperture 42 of the lubrication system reservoir 40. The larger end of the horn-shaped baffle 36 is within the reservoir 40. A curved outer surface 38 of the baffle 36 directs liquid from the separation chamber 14 into a reservoir 40 where that liquid flows as a plume against the interior surfaces of the reservoir. The tubular configuration of the baffle 36 has an aperture 44 extending centrally there through which allows gas to flow between the separator's separation chamber 14 and the reservoir 40. Note that the fluid outlet 24 of the separator 10 opens directly into the reservoir 40 of the lubricating system.

The separator 10 includes a gas outlet 46 in the center of the first end wall 16 within the separation chamber 14. The gas separated from the mixture entering the separation chamber 14 and also gas within the reservoir 40 are vented through the gas outlet 46. A pressure relief valve 48 is attached to the gas outlet 46 and opens a passage from the gas outlet when the pressure within the separator 10 reaches a given threshold level, (e.g. 0.5-0.7 bar).

The lubricant mixture is fed from the engine into the inlet 20 under the pressure from the scavenger pumps. The flow of the lubricant mixture enters the chamber 14 tangentially to the wall surface and follows a path, indicated by line 22 in FIG. 2, curving around the interior surface of the separation chamber 14. That flow travels downward toward the second end wall 26 of the chamber creating a helical vortex. The annular collector wall 28 divides the separation chamber 14 into two concentric regions, a cylindrical inner region 50 and an annular outer region 52 around the inner region 50. The boundary between the inner and outer regions 50 and 52 is indicated by broken lines 53 in FIG. 1.

As the mixture spirals downward along the inner surface of the housing 12, the cyclonic flow creates a centrifugal force field that drives the heavy debris particles to the outer reaches of the flow pattern, while at the same time allowing the gas bubbles to coalesce in the center of the pattern. The debris particles are forced downward into the collection region 30 where the second end wall 26 arrests the downward motion of those particles. The second end wall 26 also guides these particles into the debris port 32 that is tangential with the interior surface of the separation chamber.

The liquid fills the annular outer region 52 being held adjacent the chamber wall by the radial acceleration. Any gas that is entrained in this spiraling mixture migrates toward the central inner region 50 of the separation chamber 14. The separated gas is able to flow downward through the central aperture 44 within the baffle 36 and into the vapor space at the top of the oil reservoir 40. Because the fluid outlet 24 of the present separator 10 opens directly into the oil reservoir 40, it does not utilize a gas platform and associated stand pipe found in previous cyclonic fluid separators. As a consequence the pressure drop within the separator 10 is minimized, thereby increasing the efficiency of the separator.

At the same time, liquid oil spiraling downward in the separation chamber 14 exits through the fluid outlet 24 as a radially expanding plume that is indicated by broken lines 54. The optional baffle 36 aids in directing this plume outward so that the liquid impinges the side walls of the oil reservoir 40. By maintaining the rotational motion upon exiting the separator 10, the liquid is flung outward against the tank walls and then runs downward to recombine with the liquid in the lower region of the reservoir 40.

The present separator 10 also enables a reduction in the centrifugal g-forces acting upon the debris particles traveling through the separation chamber 14. Upon entering the separator via inlet 20, a particle is forced into a rotational motion as well as a downward motion toward the second end 18 which compound motion of both rotation and translation causes the particle to take on a helical trajectory through the separation chamber 14. It has been determined empirically that increased particle capture efficiency can be achieved with a reduced number of helical turns at lower g-force levels than was utilized in prior cyclonic separators. Acceleration in "G's" is the square of the inlet velocity divided by the product of the main cylinder radius (D/2) and the earth's gravitational constant. Thus, the g-force developed in the separator 10 is a function of the inlet velocity. In addition, the pressure loss increases with the square of the velocity. Therefore, to maintain a desirable minimum pressure drop across the three-phase separator 10, it is important that the inlet velocity held relatively small to develop the minimum g-force necessary for solid particle separation.

To achieve these desired operating characteristics, the separator 10 should have a structural relationship to the size of the inlet 20 as given in the following table.

TABLE 1

| Dimension | Relationship |
|---|---|
| Inlet diameter (d) = | d |
| Outlet diameter (B) = | d/0.333 |
| Chamber length (C) = | d/0.193 |
| Chamber diameter (D) = | d/0.246 |

The diameter of the gas outlet 46 may be as large as possible provided that it does not interfere with the inlet diameter.

Table 2 contains a set of beta parametric values that are derived from these dimensional relationships:

TABLE 2

| Beta | Relation | Value |
|---|---|---|
| $\beta_1$ | d/D | 0.246 |
| $\beta_2$ | d/B | 0.333 |
| $\beta_3$ | B/D | 0.738 |
| $\beta_4$ | d/C | 0.193 |

Separator Design Procedure

On the basis of empirical and theoretical data, it was determined that a minimum of 25 G's of radial force effectively separates the solid particles, low viscosity liquid oil and gas components, however a minimum of 50 G's at the lowest expected flow rate provides an adequate design margin. The minimum residence time, defined as the period of time the oil of the separated mixture resides in the outer region 52 of the separator, should be no less than 0.075 seconds. The minimum residence time occurs at the maximum fluid flow condition; conversely, maximum residence time occurs at the lowest flow condition. The volume of the outer region 52 of the separator is defined as the annulus created by the concentric chamber and fluid outlet diameters (D and B) and the chamber height (C). The residence time is determined by dividing the outer region volume by the volumetric flow rate of the oil component. The gas component is not used in the residence time calculation.

It has been experimentally determined that solid particle separation and capture efficiency are strongly related to the number of helical turns that the particles make within the separator, rather than high acceleration forces (G's) as suggested in the prior art. If a particle undergoes less than two complete helical turns, the capture efficiency for 500 micron test platelets is approximately 50%, two complete helical turns yields 80% capture efficiency, and three helical turns results in 95% or greater capture efficiency. The number of helical turns is calculated by multiplying the fluid spin rate by the residence time. The fluid spin rate N is given by the expression $N=V/(\pi D)$, where V is the fluid flow velocity of the liquid and gas mixture at the minimum inlet diameter d.

As the separator dimensions are all parametrically related, the separator sizing can theoretically start with any one of the them. However, the design preferably commences with sizing the outer region 52 of the separation chamber 14 based upon the maximum oil flow condition and a minimum residence time of 0.075 seconds. By substituting the parametric relations from Table 1 into the dimensions B, C and D of the outer region 52 (also known as the liquid section) of the separation chamber 14, yields a function for the liquid section volume LSV in terms of the inlet diameter d as follows.

$$LSV = \left[\frac{\pi D^2}{4} - \frac{\pi B^2}{4}\right]C \quad (1)$$

substituting the dimension relationships from Table 1 yields:

$$LSV = \left[\frac{\pi d^2}{4\beta_1^2} - \frac{\pi d^2}{4\beta_2^2}\right]\frac{d}{\beta_4} \quad (2)$$

and substituting the beta parameter values from Table 2 yields:

$$LSV = 30.54\, d^3. \quad (3)$$

The inlet diameter d is determined from the liquid section volume and the residence time based on the following equation:

$$\text{Residence Time} = \frac{\text{Liquid Section Volume}}{\text{Maximum Oil Flow Rate}} = \frac{30.54\, d^3}{\text{Maximum Oil Flow Rate}} \quad (4)$$

Setting the residence time to the recommended value of 0.075 seconds and rearranging equation (4) yields the following equation defining the inlet diameter d:

$$d = \sqrt[3]{\frac{(\text{Residence Time})(\text{Maximum Oil Flow Rate})}{30.54}} \quad (5)$$

Once the inlet diameter d is determined, the other separator dimensions are derived from the parametric relationships in Table 1. The solution for inlet diameter used to dimension the liquid section volume may need to be adjusted when there is a mixture of gas and liquid at the inlet. This adjustment is presented subsequently herein.

To verify that the minimum number of helical turns has been achieved, the inlet velocity must be determined in order to calculate the fluid spin rate, N. Because the gas component of the inlet flow is compressible, the volumetric flow rate of the gas component at actual conditions can only be estimated. The volumetric flow rate of the gas is a function of the design pressure drop allowance, pressurization (if any) of the oil reservoir 40, the ambient pressure, and liquid/gas mixture temperature. The liquid/gas mixture volumetric flow is estimated by applying the simplifying assumption that the mass of the gas component contributes little to the liquid/gas mixture combined mass, but does add significantly to the volumetric flow. For example, oil is about 750 times as massive as gas on a volumetric basis. Therefore, using the mass flow of the liquid only and making adjustments for the compressible gas component, the volumetric flow rate of the mixture is estimated by application of the Ideal Gas Law. Therefore, the mixture weight density is the weight density of the liquid component multiplied by the liquid volume fraction, that is, the liquid volume fraction is the volume of liquid divided by the sum of the volume of liquid and the volume of gas.

This can be simplified to:

$$LVF = \frac{\text{Volume of Liquid}}{\text{Volume of Liquid} + \text{Volume of Gas}} = \frac{1}{1+(G/L)} \quad (6)$$

where G/L is the gas volume to liquid volume ratio at "standard conditions". However, temperature and pressure affects the "actual" gas volume, therefore, the ratio is adjusted for the gas volume at the separator inlet conditions of temperature and pressure. Therefore, the Liquid Volume Fraction (LVF) adjusted to separator inlet conditions is the Liquid Volume Fraction Actual (LVFA), as given by the expression:

$$LVFA = \frac{1}{[(G/L)(P_s/P_i)(T_i/T_s)] + 1} \quad (7)$$

where G is the gas volume at standard temperature and pressure, L is the liquid volume (incompressible), Ps is the standard atmospheric pressure (1.01 bar), Pi is the separator inlet pressure (including atmospheric pressure, system pressurization, and allowable design delta pressure across the separator), Ts is the standard temperature (20° C.), and Ti is the mixture inlet temperature.

Using this simplification, the weight density of the mixture becomes $\gamma_{mixture} = LVFA * \gamma_{oil}$. In order to solve for the inlet velocity, the volumetric flow rate at actual conditions must be determined. Q is the volumetric flow per unit time of mixture passing through the separator inlet; is given by $Q = \dot{W}/\gamma_{mixture}$, where $\dot{W}$ is equal to the weight of liquid per second and $\gamma_{mixture}$ is the mixture weight density determined previously.

Now knowing the actual flow rate at the design temperature and pressure, the inlet diameter can be adjusted and the resulting inlet velocity determined. Then the fluid spin rate can be calculated. The amount of the inlet diameter adjustment is based on its relationship to the liquid volume fraction actual (LVFA). To determine that relationship one knows that the number of helical turns is equal to the product of the oil residence time and the fluid spin rate N. For a system having only liquid the number of helical turns n is given by the expression:

$$n = \left(\frac{D^2 - B^2}{d^2_{(no\ gas)}}\right)\left(\frac{C}{\pi D}\right) \quad (8)$$

for a system having a liquid/gas mixture and the same number of helical turns the following is true:

$$n = \left(\frac{D^2 - B^2}{d^2_{(with\ gas)}}\right)\left(\frac{C}{\pi D}\right)\left(\frac{1}{LVFA}\right) \quad (9)$$

Therefore:

$$LVFA = \frac{d^2_{(no\ gas)}}{d^2_{(with\ gas)}} \quad (10)$$

which equation is used to adjust the inlet diameter for the separator.

To verify that the fluid makes a sufficient number of turns within the separator 10, the inlet flow velocity V is calculated according to the equation:

$$V = \dot{Q}/A \quad (11)$$

Then the diameter D of the separation chamber 14 is calculated according to the expression $D = d_{(no\ gas)}/\beta_1$. The separation chamber diameter then is employed to derive the rotational speed N using the equation $N = V/(\pi D)$. Finally the number of helical turns n calculated by multiplying the rotational speed by the minimum residence time of 0.075 seconds.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A three-phase separator for treating a fluid flowing into a reservoir to which the separator is attached comprising:
   a housing forming a cylindrical separation chamber having a first end and a second end;
   an inlet that opens tangentially into the separation chamber to receive a mixture to be separated;
   a gas outlet in the first end of the separation chamber to allow gases that become separated from the mixture to exit the separator;
   a fluid outlet at the second end and opening into an aperture in the reservoir and through which liquid and gas flow between the separator and the reservoir;
   a baffle extending through the fluid outlet into the reservoir to direct the liquid into the reservoir and having an aperture through which gas flows from the reservoir into the separation chamber; and
   a particle collector adjacent the second end to receive solids that become separated from the mixture.

2. The three-phase separator as recited in claim 1 further comprising an annular wall projecting into the separation chamber from the second end and surrounding the fluid outlet.

3. The three-phase separator as recited in claim 1 further comprising a collection region formed within the separation chamber adjacent the second end for receiving and directing particles into the particle collector.

4. The three-phase separator as recited in claim 1 wherein the inlet has a diameter designated d, the fluid outlet has a diameter that is substantially equal to d/0.333, the separation chamber has a diameter that is substantially equal to d/0.246, and the separation chamber has a length that is substantially equal to d/0.193.

5. The three-phase separator as recited in claim 1 wherein the inlet, the separation chamber and fluid outlet cooperate whereby liquid in the mixture travels in a vortex between the inlet and the fluid outlet and makes at least two turns in the vortex.

6. The three-phase separator as recited in claim 1 wherein the inlet, the separation chamber and fluid outlet cooperate whereby liquid in the mixture travels in a vortex between the inlet and the fluid outlet and makes less than three turns in the vortex.

7. The three-phase separator as recited in claim 1 wherein the inlet separation chamber and fluid outlet cooperate whereby particles traveling within the separation chamber are subjected to a centrifugal force between 25 and 50 G's.

8. The three-phase separator as recited in claim 1 wherein the inlet separation chamber and fluid outlet cooperate whereby liquid in the mixture resides in the separation chamber at least 0.075 seconds.

9. The three-phase separator as recited in claim 1 further comprising a pressure relief valve is attached to the gas outlet and opening when pressure within the separation chamber exceeds a threshold level.

10. The three-phase separator as recited in claim 9 wherein the threshold level is between 0.5-0.7 bar, inclusive.

11. A three-phase separator comprising:
  a housing forming a cylindrical separation chamber with a longitudinal axis and having a first end wall and a second end wall;
  an inlet that opens tangentially into the separation chamber to receive a mixture to be separated;
  a gas outlet in the first end wall of the separation chamber through which gases that become separated from the mixture exit the separator;
  a fluid outlet, through which liquid and gas exit the separator, has an opening in the second end wall and aligned with the longitudinal axis;
  a baffle extending through the fluid outlet into the reservoir to direct the liquid into the reservoir and having an aperture through which gas flows from the reservoir into the separation chamber; and
  a particle collector adjacent the wall around the fluid outlet to receive solids that become separated from the mixture.

12. The three-phase separator as recited in claim 11 further comprising a connector for attaching the housing to a lubricant reservoir of a hydraulic system wherein the fluid outlet is adjacent to and opens into an inlet of the lubricant reservoir.

13. The three-phase separator as recited in claim 11 further comprising a collection region formed within the separation chamber adjacent the second end wall for receiving and directing particles into the particle collector.

14. The three-phase separator as recited in claim 13 wherein the collection region is defined by an annular wall projecting around the fluid outlet and into the separation chamber from the second end wall.

15. The three-phase separator as recited in claim 11 wherein the inlet has a diameter designated d, the fluid outlet has a diameter that is substantially equal to d/0.333, the separation chamber has a diameter that is substantially equal to d/0.246, and the separation chamber has a length that is substantially equal to d/0.193.

16. The three-phase separator as recited in claim 11 wherein the inlet separation chamber and fluid outlet cooperate whereby liquid in the mixture travels in a vortex between the inlet and the fluid outlet and makes less than three turns in the vortex.

17. The three-phase separator as recited in claim 11 wherein the inlet separation chamber and fluid outlet cooperate whereby particles traveling within the separation chamber are subjected to a centrifugal force between 25 and 50 G's.

18. The three-phase separator as recited in claim 11 wherein the inlet separation chamber and fluid outlet cooperate whereby liquid in the mixture resides in the separation chamber at least 0.075 seconds.

19. The three-phase separator as recited in claim 11 further comprising a pressure relief valve is attached to the gas outlet and opening when pressure within the separation chamber exceeds a threshold level.

20. The three-phase separator as recited in claim 19 wherein the threshold level is between 0.5-0.7 bar, inclusive.

* * * * *